United States Patent

Hagl et al.

[11] Patent Number: 5,841,364
[45] Date of Patent: Nov. 24, 1998

[54] METHOD AND APPARATUS FOR TRANSFERING INFORMATION FROM A TRANSPONDER

[75] Inventors: Andreas Hagl, Dachau; Josef H. Schuermann, Oberhummel, both of Germany

[73] Assignee: Texas Instruments Incorporated, Dallas, Tex.

[21] Appl. No.: 816,928

[22] Filed: Mar. 13, 1997

Related U.S. Application Data

[63] Continuation of Ser. No. 320,471, Oct. 7, 1994, abandoned.

[51] Int. Cl.⁶ ................................................ H04Q 1/00
[52] U.S. Cl. .................... 340/825.54; 340/825.69; 340/825.72; 342/42; 342/44; 342/51; 375/303
[58] Field of Search ................ 340/825.34, 825.54, 340/825.58, 825.69, 825.71–825.75, 572; 331/10, 34; 342/42, 44, 51; 375/303, 272, 364, 278

[56] References Cited

U.S. PATENT DOCUMENTS

| | | | |
|---|---|---|---|
| 3,755,744 | 8/1973 | Fukata | 340/825.65 |
| 3,973,241 | 8/1976 | Streckenbach et al. | 340/825.58 |
| 3,992,698 | 11/1976 | Sahasrabudhe et al. | 340/825.58 |
| 4,044,202 | 8/1977 | Antoszewski | 340/825.58 |
| 4,083,008 | 4/1978 | Eschke | 340/825.58 |
| 4,333,072 | 6/1982 | Beigel | 340/825.54 |
| 4,569,060 | 2/1986 | Esterling et al. | 340/825.58 |
| 4,577,333 | 3/1986 | Lewis et al. | 375/272 |
| 4,596,022 | 6/1986 | Stoner | 340/825.58 |
| 4,724,534 | 2/1988 | Guzman-Edery et al. | 375/62 |
| 4,730,188 | 3/1988 | Micheiser | 340/825.72 |
| 4,755,817 | 7/1988 | Vandenbulcke et al. | 340/825.58 |
| 5,041,826 | 8/1991 | Milheiser | 340/825.54 |
| 5,053,774 | 10/1991 | Schuermann et al. | 342/44 |
| 5,055,659 | 10/1991 | Hendrick et al. | 340/825.54 |
| 5,450,088 | 9/1995 | Meier et al. | 342/42 X |
| 5,451,959 | 9/1995 | Schuermann | 342/51 |
| 5,453,747 | 9/1995 | D'Hont et al. | 342/51 X |
| 5,517,194 | 5/1996 | Carroll et al. | 340/825.54 X |
| 5,521,602 | 5/1996 | Carroll et al. | 340/825.54 X |
| 5,548,291 | 8/1996 | Meier et al. | 340/825.34 X |

FOREIGN PATENT DOCUMENTS

| | | | |
|---|---|---|---|
| 650891 | 2/1992 | Australia | 340/825.54 |
| 494114 | 7/1992 | European Pat. Off. | 340/825.54 |
| 2273422 | 6/1994 | United Kingdom | 340/825.54 |

*Primary Examiner*—Brian Zimmerman
*Assistant Examiner*—William H. Wilson, Jr.
*Attorney, Agent, or Firm*—Rebecca Mapstone-Lake; James C. Kesterson; Richard L. Donaldson

[57] ABSTRACT

A transponder unit (10) includes an N cycle counter (30) and an M cycle counter (28). The N cycle counter (30) has a different cycle value than the M cycle counter (28). During the transmission of information from the transponder unit (10), the duration for data bits having a binary zero value is controlled by the N cycle counter (30). The duration of data bits having a binary one value is controlled by the M cycle counter (28). The use of different cycle values within the N cycle counter (30) and the M cycle counter (28) allows for the transmission of binary one and binary zero data bits having the same bit length despite different frequencies representing the binary one and binary zero bits respectively.

15 Claims, 1 Drawing Sheet

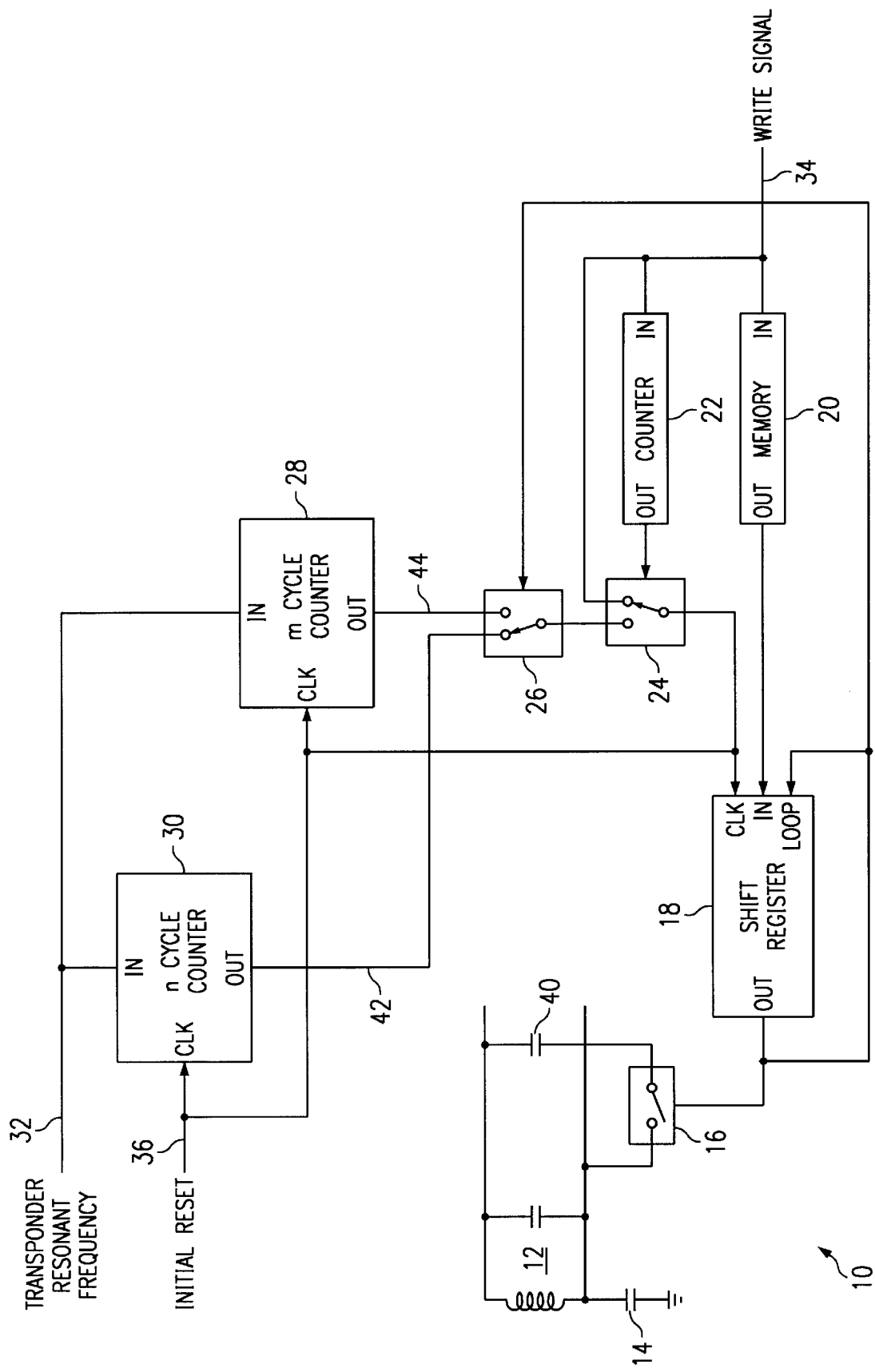

METHOD AND APPARATUS FOR TRANSFERING INFORMATION FROM A TRANSPONDER

This application is a Continuation of application Ser. No. 08/320,471, filed on Oct. 7, 1994, entitled Method and Apparatus for Transferring Information from a Transponder, now abandoned.

TECHNICAL FIELD OF THE INVENTION

The present invention relates in general to radio frequency identification systems and more particularly to a method and apparatus for transferring information from a transponder.

BACKGROUND OF THE INVENTION

Transponder units typically transfer information in response to an interrogation pulse through a frequency shift keying technique. Two modulation frequencies corresponding to a binary one and a binary zero value are used to transfer information in a digital form. However, since two modulation frequencies are used, asynchronous data transmission occurs using non-constant clock windows. Recovery of the asynchronous data transmission and recognition of the non-constant clock windows are difficult in a noisy environment. Therefore, it is desirable to have a transponder system that avoids asynchronous data transmission and recognition of non-constant clock windows in order to improve the reading of information in a noisy environment.

SUMMARY OF THE INVENTION

From the foregoing it may be appreciated that a need has arisen for a transponder system with improved reception capabilities within a noisy environment. A need has also arisen for a transponder system that avoids the use of asynchronous data transmission and recognition of non-constant clock windows.

In accordance with the present invention, a method and apparatus for transferring information from a transponder are provided which substantially eliminate and reduce disadvantages and problems associated with asynchronous transmission transponder systems.

According to an embodiment of the present invention, there is provided a method of transferring information from a transponder that includes selecting a first frequency representing data bits of information having a binary zero value. A second frequency representing data bits of information having a binary one value is also selected. A transponder resonant frequency signal is generated having one of the first and second frequencies. Information is transferred by changing a frequency of the transponder resonant frequency signal between the first and second frequencies according to the desired data bits of information to be transferred. When transferred, the data bits of information having a binary zero value have the same bit length as the data bits of information having a binary one value.

The present invention provides various technical advantages over asynchronous transmission transponder systems. For example, one technical advantage is in establishing a constant clock window for binary one and binary zero value bits. Another technical advantage is in improving the decoding of transmitted information within a noisy environment. Yet another technical advantage is in establishing different cycles for the two modulation frequencies so that the bit length for binary zero value bits and binary one value bits are the same. Other technical advantages are readily apparent to one skilled in the art from the following figure, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

The FIGURE illustrates a block diagram of a transponder unit.

DETAILED DESCRIPTION OF THE INVENTION

The FIGURE depicts a block diagram of a transponder unit 10. Transponder unit 10 includes a resonant circuit 12, a charge capacitor 14, a first switch 16, a shift register 18, a memory 20, a counter 22, a second switch 24, a third switch 26, an M cycle counter 28, and an N cycle counter 30. Further information on transponder units and transponder systems can be found in U.S. Pat. No. 5,053,774, issued Oct. 1, 1991, entitled "Transponder Arrangement", and hereby incorporated by reference herein.

In operation, transponder unit 10 receives an interrogation pulse at resonant circuit 12. The interrogation pulse charges up charge capacitor 14 in order to provide operating power to transponder unit 10. Resonant circuit 12 has a transponder resonant frequency signal 32 that is used to transmit information drive N cycle counter 30 and M cycle counter 28. Transponder resonant frequency signal 32 may also be used in generating a write signal 34 for memory 20. In response to the interrogation pulse, transponder unit 10 transmits a data telegram from memory 20 to the remote interrogation unit.

At the beginning of the transfer process, the data telegram from memory 20 is placed into shift register 18 in response to write signal 34. For a sixty-four bit data telegram, sixty-four write pulses are placed on write signal 34 in order to transfer the information from memory 20 into shift register 18. Counter 22 determines when a sixty-four bit telegram has been inserted into shift register 18 by counting the number of write pulses on write signal 34. After counter 22 identifies sixty-four write pulses, counter 22 generates a control signal to change the position of second switch 24, removing write signal 34 from the clock input of shift register 18.

To begin information transfer from shift register 18, an initial reset signal 36 is applied to N cycle counter 30 and M cycle counter 28. Initial reset signal 36 is derived from reset circuitry 50 which may be comprised of counter 22 or a separate counter that indicates the completion of data telegram insertion into shift register 18. Initial reset signal 36 also drives the clock input to shift register 18 and places the first data bit of the data telegram onto the output of shift register 18. The output of shift register 18 provides a control signal to adjust the switch position of third switch 26. For a binary zero value on the output of shift register 18, third switch 26 is positioned to allow N cycle counter 30 to control shift register 18. For a binary one value on the output of shift register 18, third switch 26 is positioned to allow M cycle counter 28 to control shift register 18. The output of shift register 18 also controls first switch 16 that determines which one of a first frequency F1 and second frequency F2 is tuned within resonant circuit 12 for transmission of each data bit of the data telegram. First switch 16 connects or disconnects capacitor 40 from resonant circuit 12 according to the transponder resonant frequency desired to be output from transponder unit 10.

N cycle counter 30 and M cycle counter 28 control the transfer of information from shift register 18 according to the position of third switch 26. N cycle counter 30 counts N cycles of transponder resonant frequency signal 32 and generates a clock signal 42 upon counting the appropriate number of cycles. Similarly, M cycle counter 28 counts M cycles of transponder resonant frequency signal 32 and generates a clock signal 44 after the appropriate number of cycles have been counted. Since N cycle counter 30 and M cycle counter 28 use a different cycle value, the clock signals from each are not generated at the same time. The different cycle values ensure that the bit lengths of each data bit transmitted from resonant circuit 12 have the same length despite the different modulation frequencies of resonant circuit 12 used in transmitting binary one and binary zero value bits.

Operation of transponder unit 10 will now be considered with respect to a four bit data telegram 1101. After memory 20 has inserted the four bit telegram into shift register 18 in response to write signal 34 and counter 22 has counted the four bits to generate the control signal to change the position of second switch 24, initial reset signal 36 is applied to N cycle counter 30, M cycle counter 28, and shift register 18. Initial reset signal 36 drives shift register 18 to place the first data bit value "1" onto the output of shift register 18. The data bit value "1" drives third switch 26 to place M cycle counter 28 in connection with the clock input of shift register 18. The data bit value "1" also drives first switch 16 to connect capacitor 40 to resonant circuit 12 and tune resonant circuit 12 to the second frequency F2 for transmission of the data bit value "1".

After the count of M is reached, M cycle counter 28 generates clock signal 44 that drives shift register 18 to place the second data bit value "1" onto its output. Clock signal 44 from M cycle counter 28 is also used to reset N cycle counter 30 and M cycle counter 28 in order to begin a new counting interval. The second data bit value "1" forces capacitor 40 to remain connected within resonant circuit 12 through switch 16 and forces M cycle counter 28 to remain connected to shift register 18.

After another count of M is reached, M cycle counter 28 generates clock signal 44 that forces shift register 18 to place the third data bit value "0" onto its output. Clock signal 44 from M cycle counter 28 resets N cycle counter 30 and H cycle counter 28 to begin the new counting interval. The data bit value "0" drives first switch 16 to remove capacitor 40 from resonant circuit 12. In this manner, resonant circuit 12 is now tuned to the first frequency F1 for transmission of the third data bit value "0". The third data bit value "0" also drives third switch 26 to connect N cycle counter 30 to the clock input of shift register 18.

After a count of N has been reached, N cycle counter 30 generates clock signal 42 to drive shift register 18 and place the fourth data bit value "1" onto the output of shift register 18. Clock signal 42 from N cycle counter 30 also resets N cycle counter 30 and M cycle counter 28 for the new countdown sequence. The fourth data bit value "1" drives switch 16 to connect capacitor 40 to resonant circuit 12 and tune resonant circuit 12 to the second frequency F2 for the transmission of the fourth data bit value "1". The fourth data bit value "1" also drives third switch 26 to reconnect M cycle counter 28 to shift register 18. This process continues for all data bits of the data telegram.

As described, resonant circuit 12 can be tuned to one of two different frequencies F1 and F2 for the transmission of binary zero and binary one level bits. A specific frequency for a binary one level bit can be used to determine the second frequency. For example, frequency F1 for a binary zero value bit may have a frequency of 134.2 kHz. The number of seconds to transmit a binary zero value bit for each cycle at this frequency is 7.45 microseconds. If twelve cycles were used as a value in N cycle counter 30, the duration of a binary zero value bit would be 89.40 microseconds. Since it is desired to have the duration of the binary zero value bit be of the same length as the binary one value bit, the binary one value bit will also have a duration of 89.40 microseconds. If eleven cycles were used as the value in M cycle counter 28, the time required to transmit a binary one value bit for each cycle would be 8.127 microseconds. Thus, frequency F2 necessary to transmit a binary one value bit would be 123.0 kHz.

The resonant circuit 12 can now be tuned to one of the selected frequencies F1 and F2 through appropriate parameter choices of capacitor 40. After proper tuning, resonant circuit 12 can produce a transponder resonant frequency having one of first and second frequencies F1 and F2 according to the position of first switch 16. Data bits of information are transmitted from resonant circuit 12 according to the frequency of the transponder resonant frequency. The specific frequencies and cycle values used above are for illustrative purposes and may be changed or altered for other desired implementations of transponder unit 10.

In summary, a transponder unit transmits information through frequency shift keying over two modulation frequencies. The information transferred by the transponder unit has the same bit length regardless of whether a binary zero value bit or a binary one value bit is transmitted. The same bit length for each data bit of the information is achieved by applying different cycle values to the two modulation frequencies. In this manner, a constant clock window for binary zero and binary one bits is generated to improve information decoding.

Thus, it is apparent that there has been provided, in accordance with the present invention, a method and apparatus for transferring information from a transponder that satisfy the advantages set forth above. Although the preferred embodiment has been described in detail, it should be understood that various changes, substitutions, and alterations can be made herein. For example, many of the direct connections illustrated herein could be altered by one skilled in the art such that two devices are merely coupled to one another through an intermediate device or devices without being directly connected while still achieving the desired results demonstrated by the present invention. Other examples are readily ascertainable by one skilled in the art and could be made without departing from the spirit and scope of the present invention as defined by the following claims.

What is claimed is:

1. A method of transferring information from a transponder, comprising the steps of;

selecting a first frequency representing data bits of information having a binary zero value;

selecting a second frequency representing data bits of information having a binary one value;

generating a transponder resonant frequency signal having one of the first and second frequencies;

changing a frequency of the transponder resonant frequency signal between the first and second frequencies in response to the data bits of the information in order to transmit the information, the data bits of information having a binary zero value being of a same bit length as the data bits of information having a binary one value;

counting a first number of cycles of the first frequency; and counting a second number of cycles of the second frequency, the first number of cycles being different than the second number of cycles to achieve the same bit length, each counting step controlling the changing of the transponder resonant frequency signal according to each data bit of information to be transmitted.

2. The method of claim 1, further comprising the step of:

resetting each counting step for each data bit of information transmitted.

3. The method of claim 1, wherein the first number of cycles is greater than the second number of cycles.

4. The method of claim 3, wherein the first number of cycles is twelve and the second number of cycles is eleven.

5. The method of claim 3, wherein the first frequency is 134.2 kHz and the second frequency is 123.0 kHz.

6. A transponder for transferring information, comprising:

a resonant circuit operable to generate a transponder resonant frequency signal, said transmit frequency signal having one of a first frequency and a second frequency, said first frequency representing data bits of information having a binary zero value, said second frequency representing data bits of information having a binary one value;

a control circuit operable to select one of said first and second frequencies for said transponder resonant frequency signal associated with each data bit of information, said control circuit transmitting each data bit of information with a same bit length regardless of which of said first and second frequencies is selected for said transponder resonant frequency signal;

wherein said control circuit includes a first counter circuit associated with said first frequency and a second counter circuit associated with said second frequency, said first counter circuit operable to count down from a first value, said second counter circuit operable to count down from a second value, said first value being different than said second value to achieve said same bit length.

7. The transponder of claim 6, wherein said first and second counter circuits count a number of cycles of said transponder resonant frequency signal according to said first and second values respectively.

8. The transponder of claim 6, wherein said first and second counters are reset for each data bit of information transmitted by said resonant circuit.

9. The transponder of claim 6, wherein said first value is one more than said second value.

10. The transponder of claim 9, wherein said first value is twelve, and said second value is eleven.

11. The transponder of claim 6, wherein said first frequency is 134.2 kHz and said second frequency is 123.0 kHz.

12. A transponder for transmitting information comprising:

a resonant circuit operable to generate a transponder resonant frequency signal said transponder resonant frequency signal having one of a first frequency and a second frequency, said first frequency representing data bits of information having a binary zero value, said second frequency representing data bits of information having a binary one value;

a switch circuit operable to change said transmit frequency of said resonant circuit between said first and second frequencies;

a first counter circuit operable to count a first number of cycles of said transponder resonant frequency signal, said first counter circuit associated with said first frequency;

a second counter circuit operable to count a second number of cycles of said transponder resonant frequency signal, said second counter circuit associated with said second frequency;

a memory circuit operable to store said data bits of information, said memory circuit operable to sequentially transfer each data bit of information in response to one of said first and second counter circuits in order to control said switch circuit, said first and second counter circuits ensuring that each data bit of information is transmitted by said resonant circuit with a same bit length regardless of which of said first and second frequencies is selected for said transponder resonant frequency signal.

13. The transponder of claim 12, further comprising:

reset circuitry operable to initialize said memory circuit, said first counter circuit, and said second counter circuit, said reset circuit operable to reset said first and second counter circuits for each data bit of information to be transmitted by said resonant circuit.

14. The transponder of claim 12, wherein each data bit of information determines which one of said first and second counter circuits controls said switch circuit.

15. The transponder of claim 14, further comprising:

a second switch circuit operable to select one of said first and second counter circuits in response to each data bit of information in order to control sequential transfer of each data bit of information by said memory circuit.

* * * * *